United States Patent [19]

Schmidt et al.

[11] Patent Number: 5,076,056
[45] Date of Patent: Dec. 31, 1991

[54] ENHANCED PNEUMATIC BRAKE SYSTEM

[75] Inventors: David J. Schmidt, Troy, Mich.; Douglas A. Fecher, Granger, Ind.

[73] Assignee: Allied Signal Inc., Morristown, N.J.

[21] Appl. No.: 561,136

[22] Filed: Aug. 1, 1990

[51] Int. Cl.$^5$ .............................................. F16D 31/00
[52] U.S. Cl. ....................................... 60/329; 60/418; 60/548
[58] Field of Search ................. 60/413, 415, 418, 329, 60/547, 548; 219/205, 206, 207, 208

[56] References Cited

U.S. PATENT DOCUMENTS

| Re. 28,191 | 10/1974 | Kytta et al. | 92/166 |
|---|---|---|---|
| 3,633,363 | 1/1972 | Larsen | 60/548 |
| 3,822,388 | 7/1974 | Martini et al. | 60/413 |
| 4,759,255 | 7/1988 | Shimamura | 60/547.1 |
| 4,769,989 | 9/1988 | Ostwald et al. | 60/418 |

Primary Examiner—John T. Kwon
Assistant Examiner—Hoang Nguyen
Attorney, Agent, or Firm—Leo H. McCormick, Jr.; Ken C. Decker

[57] ABSTRACT

In a brake system (10) having a fluid pressure servomotor (12) with a housing having an operational chamber (30) connected to an intake manifold (102) of a vehicle and a control chamber (32) connected to an accumulator (50). A wall (28) which separates the operational chamber (30) from the control chamber (32) carries a valve (38) connected to receive an input from an operator by way of pedal (20). In the rest position, the valve (38) allows the vacuum created at the intake manifold (102) to evacuate air from the operational chamber (30) and control chamber (32). When an operator desires to effect a brake application, an input force applied to the valve (38) by way of pedal (20) allows air from the accumulator (50) to be communicated to the control chamber (32) and create a pressure differential across the wall (28). The pressure differential moves the wall (28) to produce an output force to pressurize fluid in a master cylinder (14) which is communicated to the individual wheel brakes (16, 18) to complete a brake application. The air supplied to the control chamber (32) from the accumulator (50) has been heated to a predetermined temperature to increase the pressure therein above atmospheric pressure enhance the development of the pressure differential.

11 Claims, 1 Drawing Sheet

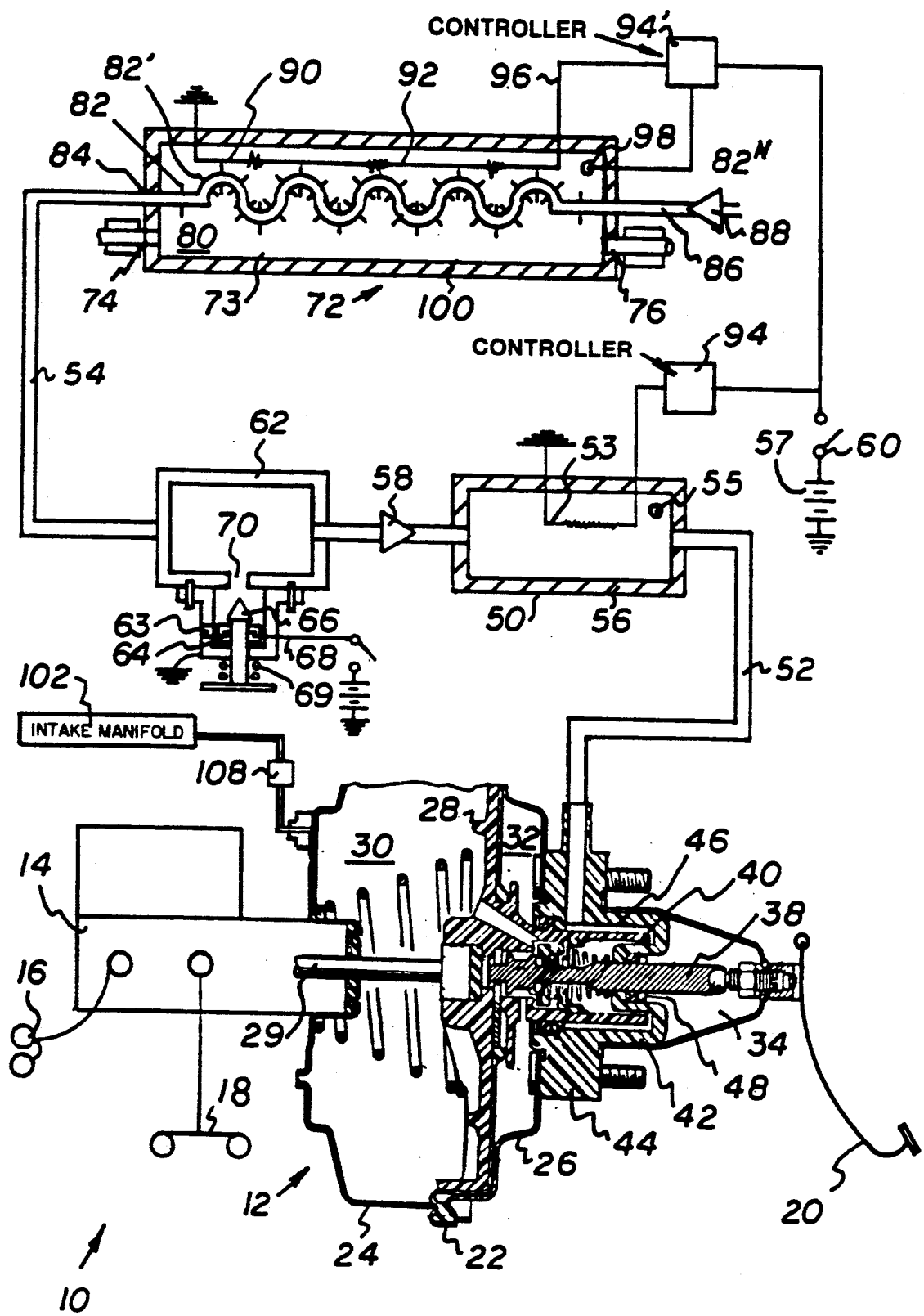

ENHANCED PNEUMATIC BRAKE SYSTEM

This invention relates to a pneumatic brake system wherein the air supplied to a control chamber to effect a brake application has been heated to increase the pressure thereof and correspondingly the ability to create a higher brake force in response to an operator input.

In vehicles having an internal combustion engine it is common practice to utilize a pressure differential servomotor to provide an assist in the actuation of a master cylinder to effect a brake application. With the addition of pollution control devices and other vacuum operated components such as power windows, headlight covers, windshield wipers, and etc., the available vacuum in internal combustion engines for any one component could be decreased if all components were operating at the same time. To overcome the problem of simultaneous use of vacuum, U.S. Pat. Nos. 3,754,841, 4,211,200 and 4,224,791 illustrate efforts to enhance the available vacuum level in internal combustion engines. Automobile manufactures have not accepted the solutions disclosed in these patents for various reasons but primarily because of the added cost involved. Since the pressure differential is made up of two parts, vacuum and air at atmospheric pressure, it has also been suggested that high pressure air be selectively used to meet optimum output forces. U.S. Pat. No. Reissue 28,191 discloses one such brake system. In this system a pneumatic brake booster is adapted to use pressurized air to develop a pressure differential to develop a desired output force for effecting a brake application. In this brake system, a compressor is required to provide the high pressure air used in the generation of the pressure differential. Since a compressor adds cost to the brake system and its operation can reduce the available horsepower of the engine, the brake system has not been placed in vehicles offered to the public.

A well known axiom of physics states that when a gas is maintained at a constant temperature, the pressure and volume are inversely proportional or have a constant product. Conversely when the temperature of a gas increases, either the pressure or volume can change accordingly. In a brake system having a pneumatic operated brake booster having air and vacuum as the pressure differential media used to create an operational force, the volumes of the control chamber and operational chamber are constant. Applying the above law of physics to such a pneumatic brake booster structure, a greater output force should be developed by heating the air presented to develop the pressure differential.

In the present invention, a brake system has a fluid pressure servomotor with an operational chamber connected to an intake manifold of an internal combustion engine to establish a first source of fluid having a first pressure and a control chamber connected to an accumulator to establish a second source of fluid having a second pressure. A movable wall which separates the operational chamber from the control chamber carries a control valve for controlling the communication of said first source of fluid having the first pressure between the operational chamber and the control chamber. The control valve responds to an operator input for communicating the second source of fluid having the second pressure to the control chamber to create a pressure differential across said wall. The wall responds to the pressure differential by moving and providing an output force corresponding to the operator input to effect a brake application. The temperature of the second source of fluid in the accumulator is raised to a level whereby the pressure therein is increased above atmospheric pressure to enhance the development of the pressure differential.

It is an object of this invention to provide a brake system with a pneumatic operated brake booster wherein the air has been heated to increase the pressure therein and thereby enhance the development of the operational pressure differential used to create the output force used to effect a brake application.

It is a further object of this invention to provide a brake system with heater means for changing and increasing the temperature and correspondingly the pressure in air supplied to develop a pressure differential in a brake booster to effect a brake application.

An advantage in the present invention resides in the use of a heat exchanger connected to the radiator of an internal combustion engine to raise the temperature of air supplied to operate a brake booster, the increase in temperature causing a corresponding increase in the pressure of the air to enhance the development of an operational pressure differential for effecting a brake application.

These objects and advantages should be apparent from reading this specification while viewing the drawing.

The drawing is a schematic illustration of a brake system made according to the invention disclosed herein wherein a heat exchanger raises the temperature and correspondingly the pressure of air supplied to develop a pressure differential for operating a brake booster.

The brake system 10 shown in the drawing includes a brake booster 12 of the type shown and fully described in U.S. Patent Reissue 28,191 which is attached to a master cylinder 14 for supplying wheel brakes 16 and 18 with pressurized fluid to effect a brake application in response to an input applied to pedal 20 by an operator.

The brake booster 12 has a housing 22 with a front shell 24 joined to a rear shell 26. A wall 28 separates the interior or the housing 22 into an operational chamber 30 and a control chamber 32. A control valve 34 carried by the hub 36 in wall 28 has a plunger 38 which is urged against a poppet 40 by a spring 42 to allow communication between the operational chamber 30 and the control chamber 32. An adapter 44 located on the rear shell 26 has a passageway 46 and seal 48 that surrounds plunger 38 to define a closed flow path through conduit 52 between an accumulator 50 and the control valve 34.

The accumulator 50 has a fixed volume for retaining air that has been heated to a predetermined temperature prior to being supplied to control chamber 32 in the booster 12. A check valve 58 is located in the air supply conduit 54 to allows air to freely enter into the accumulator 50 but prevents the reverse flow air out of the accumulator 50. A resistive heater 53 located in the accumulator 50 includes a thermostat 55 connected to a controller 94 that receives electrical energy from battery 57 when ignition switch 60 of the vehicle is in the run position. The resistive heater 53 is operated to maintain the temperature of the air in the accumulator 50 at the predetermined temperature when the vehicle switch is moved to the run position. In addition, an insulator 56 surrounds the accumulator 50 to prevent the loss of heat once the air in the accumulator 50 has reached the desired temperature.

A relief valve 62 located in the supply conduit 54 includes a solenoid 64 connected to an electrical power supply and the stop light switch 21 associated with the brake pedal 20 by lead 68. A spring 69 in the solenoid 64 holds the plunger 66 on seat 70 in the relief valve 62. If the pressure in conduit 54 reaches a predetermined value, spring 69 is overcome and plunger 66 moves away from seat 70 to provide a communication path through opening 63 for air to flow to the engine compartment of the vehicle.

A heat exchanger 72 has a housing which surrounds a portion of the supply conduit 54. The housing has a chamber 80 with an entrance port 74 for receiving engine coolant from a hose connected to the radiator of the vehicle and an exit port 76 for returning the coolant to the radiator. That portion of the supply conduit 54 located in chamber 80 has a series of fins 82, 82'...82$^n$ which act as conductors of heat between the chamber 80 and the interior of the supply conduit 54. The supply conduit 54 in the chamber is shown as being in a spiral from the entrance port 84 to the exit port 86. A check valve 88 located in the supply conduit 54 freely allows air from the surrounding environment to enter the conduit 54 but prevents the reverse flow of the air.

A resistive heater 90 which has an element 92 located in chamber 80 is connected to a controller 94' by lead 96. Controller 94' is connected to a thermostat 98 located in chamber 80 and to the ignition switch 60. A layer of insulation 100 surrounds the housing 73 of exchanger 72 to assure that any thermal energy created in chamber 80 is not communicated to the surrounding environment.

When the ignition switch 60 of the vehicle is turned to the run position, electrical energy is supplied to controller 94. Thermostat 55 provided controller 94 with a signal indicative of the temperature in accumulator 50. From experimentation it has been determined that a change in the fluid pressure of air in the accumulator from 14.3 psi to 17.6 psi occurs if the temperature is increased from 70° F. to a temperature of 190° F. This increase in fluid pressure can result in an increase in the output force produced by booster 12 of about 20%. With the brake pedal 20 in the rest position, the thermostat 55 continues to send the controller 94 a signal until resistive heater 52 has raised the temperature of the air in the accumulator 50 to the predetermined temperature of approximately 190° F. The insulator 56 reduces the heat loss from the accumulator 50 such that the controller 94 in response to the signal from the thermostat 55 cycles the electrical energy to the resistive heater 52 only when needed to maintain the predetermined temperature in the accumulator 50.

With the brake pedal 20 in the rest position, the stop light switch is in the off position and port 63 of the relief valve 62 is closed to the engine compartment of the vehicle. Air from the supply conduit 54 is heated in exchanger 72 by the exchange of thermal energy from engine coolant to air in the supply conduit 54. The increase in temperature of the air causes the pressure in conduit 54 to increase as the air expands until a predetermine pressure level is achieved sufficient to overcome spring 69 and allow plunger 66 to move off seat 70 and allow air to escape from conduit 54. Thermostat 98 supplies controller 94' with a signal of the temperature in chamber 80 and if the coolant is not circulating as when the vehicle is initially started, electrical energy is supplied to resistive heater 90 which creates thermal energy to chamber 80 to aid in the heating of the air in the supply conduit 54.

When an operator desires to effect a brake application, an input force is applied to pedal 20 which moves plunger 38 to allow pressurized air to flow from the accumulator 50 through conduit 52 to chamber 32 to develop a pressure differential across wall 28 with the air in chamber 30. This pressure differential moves the wall 28 to provide push rod 29 with a force to operate the master cylinder and supply the brakes 16 and 18 in the wheels with a force corresponding to the input force applied to brake pedal 20.

Movement of the brake pedal 20 by the input force causes the brake light switch 21 to be activated and electrical energy to flow to solenoid 64. When solenoid 64 is activated, plunger 66 is moved away from seat 70 to open the supply conduit 54 and allow heated air in the heat exchanger 72 to flow through port 63 and allow cool air from the passenger compartment to enter the heat exchanger 72 by way of check valve 88. The cool air has a higher density than the heated air it replaces and as a result on heating the fluid pressure therein can be increased.

When the input force on brake pedal 20 terminates, the brake light switch 21 is deactivated and correspondingly the electrical energy to solenoid 64 also terminates. With solenoid 64 in the inactive state, Plunger 66 moves toward seat 70 trapping air in conduit 54 and allow the pressure of the air to be increased as the temperature therein is raised. Controller 94 in response to the input signal from thermostat 55 continues to cycle the electrical energy to resistive heater 52 to maintain the temperature and correspondingly the air in the accumulator 50 at the predetermined level for use in effecting a brake application by an operator at a later time.

It has been suggested that the pressure differential could be further enhanced if the air from the intake manifold 102 connected to evacuate air from the operational chamber 30 and control chamber 32 after a brake application were cooled. Since most vehicles have air conditioning it is possible that conduit 106 from the intake manifold 102 could be cooled by the air conditioning compressor 108. Should the vacuum developed at the manifold 102 which is the first fluid at the first pressure in this brake booster 12 be cooled and air from the accumulator 50 be heated, an pressure differential should be created to provide an optimum output for the brake booster 12.

I claim:

1. In a brake system having as fluid pressure servomotor with an operational chamber connected to a source of fluid having a first pressure and a control chamber connected to a source of fluid having a second pressure, a wall for separating said operational chamber from the control chamber, a control valve for allowing said fluid having the first pressure to be communicated to said control chamber and responding to an operator input for allowing fluid having the second pressure to be communicating to said control chamber to create a pressure differential across said wall, said wall responding to said pressure differential by moving and providing an output force corresponding to the operator input to effect a brake application, the improvement comprising:

heater means for heating atmospheric air to a predetermined temperature to correspondingly increase the pressure therein above atmospheric pressure to create said second pressure.

2. In the brake system as recited in claim 1 further comprising:

an accumulator for holding a predetermined volume of air at said second pressure, said heater means maintaining the temperature of said atmospheric air in said accumulator at said predetermined temperature.

3. In the brake system as recited in claim 2 further comprising:

a heat exchanger surrounding a supply conduit through which atmospheric air is supplied to said accumulator, said heat exchanger initially raising the temperature of said atmospheric air in the supply conduit.

4. In the brake system as recited in claim 3 further comprising:

first check valve means for preventing atmospheric air in said supply conduit from being communicated back into the surrounding environment.

5. In the brake system as recited in claim 4 further comprising:

second check valve means located in said supply conduit for preventing atmospheric air at said second pressure from being communicated from said accumulator back into said supply chamber.

6. In the brake system as recited in claim 5 further comprising:

release means responsive to the termination of said operator input for limiting the pressure of said atmospheric air in said supply conduit.

7. In the brake system as recited in claim 6 wherein said heat exchanger further includes:

a housing having an inlet port connected to receive engine coolant and an outlet port for returning said engine coolant to said engine, said engine coolant raising the temperature of the atmospheric air in said supply conduit to approximately the same temperature as the engine coolant.

8. In the brake system as recited in claim 7 wherein said heat exchanger further includes:

fins located on said supply conduit located in said heat exchanger to enhance the transfer of heat between the engine coolant and atmospheric air in the supply conduit.

9. In the brake system as recited in claim 8 wherein said heat exchanger further includes:

a resistive heater located in said chamber to heat the engine coolant when the temperature therein is below a predetermined temperature.

10. In the brake system as recited in claim 9 wherein said heat exchanger further includes:

temperature responsive means located in said chamber and connected to said resistive heater for terminating the actuation of said resistive heater when the temperature in said chamber reaches said predetermined temperature therein.

11. The brake system as recited in claim 1 further including:

cooling means for cooling the fluid in said operational chamber to enhance the first pressure created by vacuum produced in the engine.

* * * * *